(12) United States Patent
Coimbra De Andrade et al.

(10) Patent No.: US 12,385,744 B2
(45) Date of Patent: Aug. 12, 2025

(54) SYSTEMS AND METHODS FOR TRAINING A DRIVING AGENT BASED ON REAL-WORLD DRIVING DATA

(71) Applicant: Verizon Patent and Licensing Inc., Basking Ridge, NJ (US)

(72) Inventors: Douglas Coimbra De Andrade, Florence (IT); Vidhya Seran, Irving, TX (US); Francesco Sambo, Florence (IT); Jerry Gamble, Jr., Grapevine, TX (US); Tommaso Bianconcini, Florence (IT); Leonardo Taccari, Florence (IT); Aurel Pjetri, Florence (IT); Leonardo Sarti, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 18/463,989

(22) Filed: Sep. 8, 2023

(65) Prior Publication Data
US 2025/0085108 A1    Mar. 13, 2025

(51) Int. Cl.
*G01C 21/16*    (2006.01)
*G01S 19/49*    (2010.01)

(52) U.S. Cl.
CPC .......... *G01C 21/1656* (2020.08); *G01S 19/49* (2013.01)

(58) Field of Classification Search
CPC .............................. G01C 21/1656; G01S 19/49
See application file for complete search history.

(56) References Cited

PUBLICATIONS

"Smarthep: Synergies between Machine leArning, Real Time analysis and Hybrid architectures for efficient Event Processing and decision making," Horizon 2020, 8 Pages.
"Learning to Drive: Beyond Pure Imitation," Waypoint—The official Waymo blog, Dec. 10, 2018, 8 Pages.
Rasheed et al., "Fine-tuned CLIP Models are Efficient Video Learners," Mar. 26, 2023, 13 Pages.

*Primary Examiner* — Mathew Franklin Gordon

(57) ABSTRACT

A device may receive video data and corresponding GPS data and IMU data associated with a vehicle, and may remove video frames from the video data to generate modified video data. The device may select objects and image regions of video frames of the modified video data, and may determine a current speed and a current turn angle of the vehicle based on the GPS data, the IMU data, and the modified video data. The device may mask the objects of the video frames of the modified video data to learn first features, and may mask the image regions of the video frames of the modified video data to learn second features. The device may generate a trained neural network model based on the current speed, the current turn angle, the first features, and the second features, and may implement the trained neural network model in the vehicle.

20 Claims, 12 Drawing Sheets

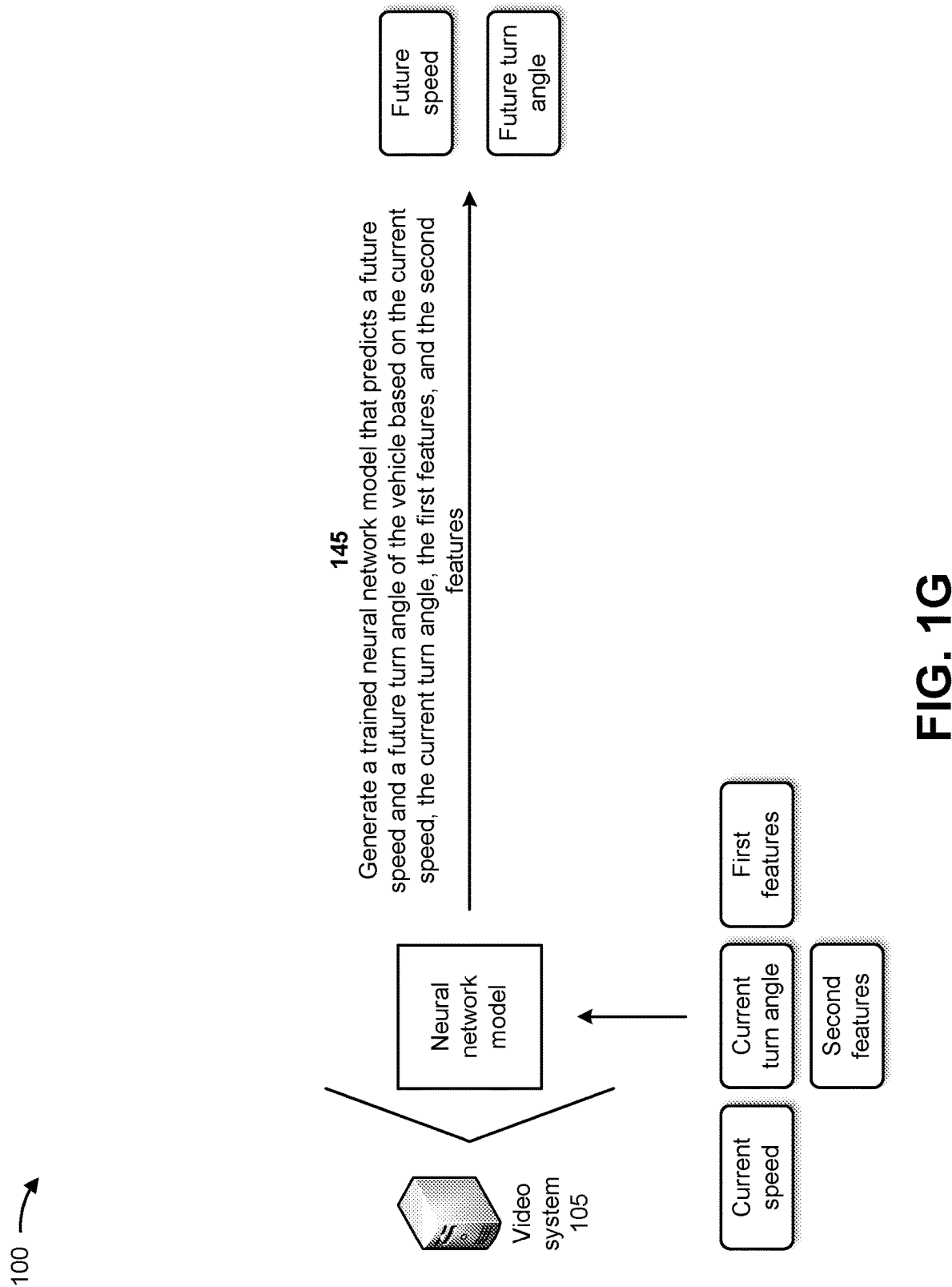

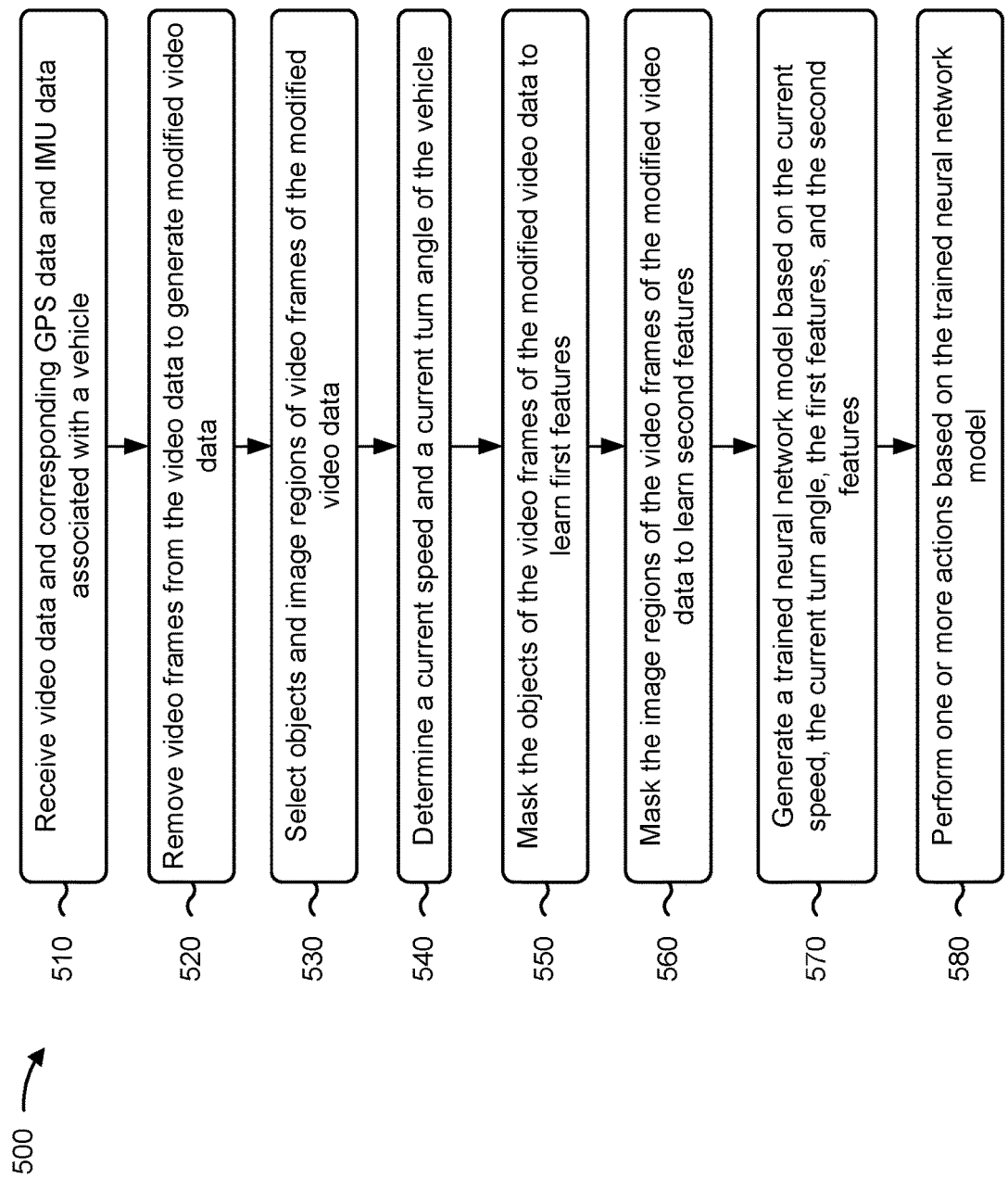

SYSTEMS AND METHODS FOR TRAINING A DRIVING AGENT BASED ON REAL-WORLD DRIVING DATA

BACKGROUND

Self-driving vehicles may provide multiple benefits, such as increased safety, better energy efficiency and traffic flow, increased productivity and convenience (considering that the time spent driving could be used for something else), and/or the like.

BRIEF DESCRIPTION OF THE DRAWINGS

FIGS. 1A-1H are diagrams of an example associated with training a neural network model to predict driving behavior based on video data, global positioning system (GPS) data, and inertial measurement unit (IMU) data.

FIG. 5 is a flowchart of an example process for training a neural network model to predict driving behavior based on video data, GPS data, and IMU data.

DETAILED DESCRIPTION OF EXAMPLE EMBODIMENTS

Figure 1A:
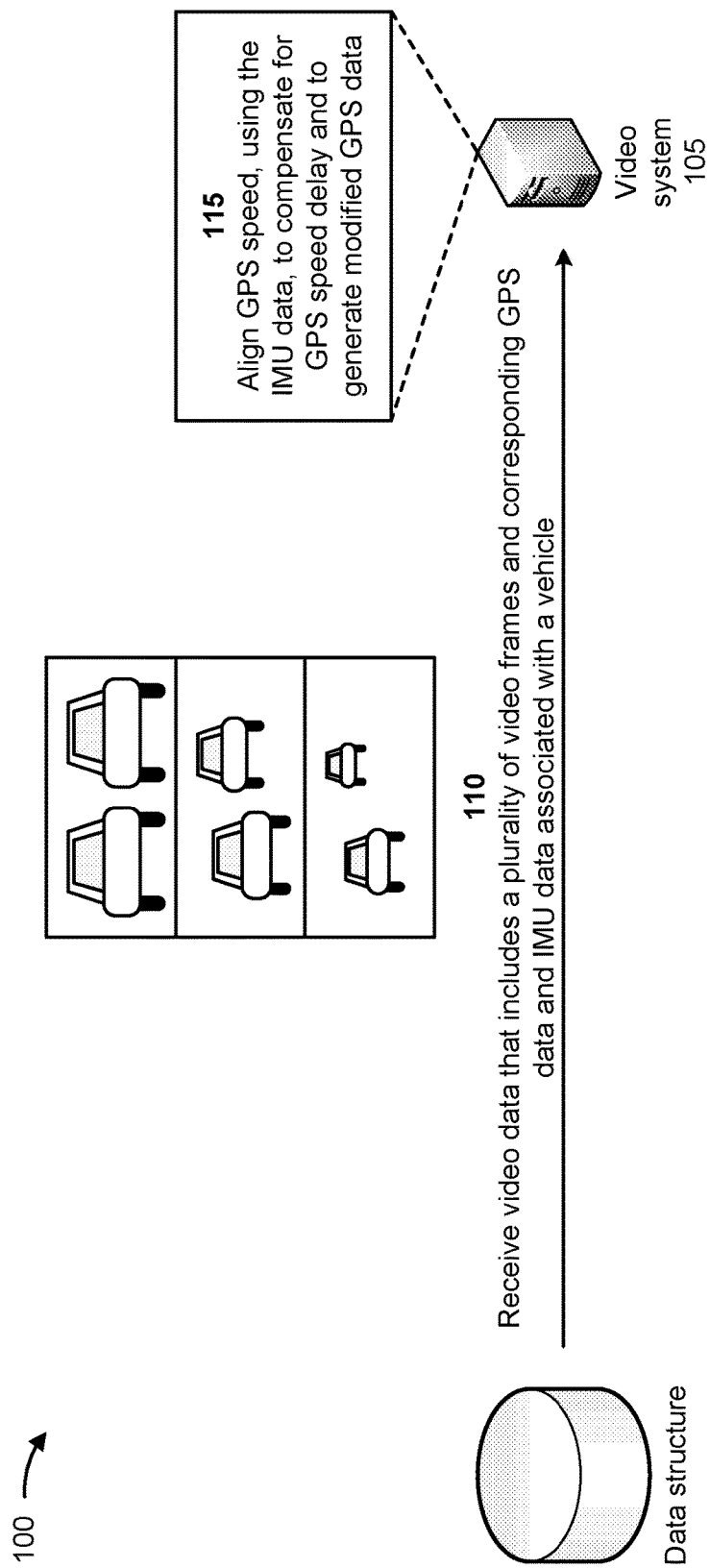

The following detailed description of example implementations refers to the accompanying drawings. The same reference numbers in different drawings may identify the same or similar elements.

Concerns and limitations related to self-driving vehicles still prevent widespread use of vehicles in a fully autonomous mode. Nonetheless, an advanced driver assistance system (ADAS) utilizes sensor data (e.g., used for self-driving) to increase driver safety by providing meaningful warnings (e.g., tailgating, excessive speed, and/or the like) and sometimes limited control of the vehicle (e.g., automatic braking in dangerous situations or automatic steering to keep the vehicle centered in the lane). One problem, however, with self-driving vehicles is obtaining realistic data to enable self-driving in multiple situations, including dangerous situations. One of the most widely used methods to train machine learning models in self-driving tasks is imitation learning, in which an environment around a vehicle is captured using one camera (and optionally more cameras and/or multiple sensors, such as radar, lidar, an IMU, and/or the like) and this information is used to try to mimic what an expert driver would do given a current state of the vehicle.

Research groups interested in self-driving resort to hiring drivers and appending sensors to a steering wheel and an accelerator to be able to use expert driving input for comparing with a desired output of a machine learning system (i.e., effectively mimicking a driving style). However, the data input into these machine learning systems is limited, because only a limited quantity of drivers (and as a consequence driving styles) can be hired for testing. The driving is not naturalistic because real drivers are often under pressure to go fast between two locations and have otherwise different needs while driving, such as checking appointments, making sure that the driving style does not damage cargo, and/or the like. Despite collecting many hours of such driving data, much of the data is redundant and just represents normal, non-challenging driving scenarios that could be handled in a simple manner (i.e., almost all of the data could be discarded during training of a model without much loss in terms of predictive accuracy of the machine learning model). Even if the drivers stay on the road day and night during their working hours, the amount of data collected is still very limited due to the limited total number of drivers and the absence of naturalistic driving. All of this significantly increases the difficulty for research groups to develop effective self-driving vehicles and ADAS.

Thus, current ADAS techniques and implementations using machine learning models for self-driving tasks consume computing resources (e.g., processing resources, memory resources, communication resources, and/or the like), networking resources, and/or other resources associated with failing to train the system to predict information useful for actual driving conditions, generating incorrect predictions with the improperly trained machine learning model, performing dangerous driving maneuvers based on the incorrect predictions, handling traffic accidents caused by the dangerous driving maneuvers, and/or the like.

Some implementations described herein relate to an automated driving agent system that is trained on a neural network model, to predict driving behavior based on real-world driving data, e.g., dashcam video data, global positioning system (GPS) or global navigation satellite system (GNSS) data, and inertial measurement unit (IMU) data or other vehicle sensor data. For example, the video system may receive video data that includes a plurality of video frames and corresponding GPS data and IMU data associated with a vehicle, and may remove video frames from the video data and/or predict an appearance of removed video frames to generate modified video data. The video system may select objects and image regions of video frames of the modified video data, and may determine a current speed and a current turn angle of the vehicle based on the GPS data, the IMU data, and the modified video data. The video system may mask the objects (e.g., vehicles, pedestrians, and/or the like) of the video frames of the modified video data and/or predict an appearance of masked objects to learn first features of the video frames of the modified video data, and may mask the image regions (e.g., portions of the road, and/or the like) of the video frames of the modified video data to learn second features of the video frames of the modified video data. The trained neural network model will be able to generate one or more possible vehicle actions based on the current speed, the current turn angle, the first features, and the second features.

In this way, the video system trains a neural network model to predict driving behavior based on video data, GPS data, and IMU data. For example, the video system may train a neural network model to utilize GPS data and IMU data to determine future driving maneuvers based on input from a camera associated with a vehicle. The video system may decouple predicted driving commands from actual physical inputs, which makes the neural network model agnostic to vehicle make, model, and size. The video system may generate a trained neural network model that identifies instantaneous speed and turn rate for a vehicle from video data, and that predicts vehicle maneuvers based on the video data. The video system may utilize auxiliary tasks that improve an ability of the neural network mode to understand semantics of the video data, and may provide inputs of desired maneuvers to the vehicle to achieve a target trajectory. Thus, the video system may conserve computing resources, networking resources, and/or other resources that would have otherwise been consumed by failing to train the machine learning model to predict information useful for actual driving conditions, generating incorrect predictions with the improperly trained machine learning model, performing dangerous driving maneuvers based on the incorrect predictions, handling traffic accidents caused by the dangerous driving maneuvers, and/or the like.

FIGS. 1A-1H are diagrams of an example 100 associated with training a neural network model to predict driving behavior based on video data, GPS data, and IMU data. As shown in FIGS. 1A-1H, example 100 includes a video system 105 associated with a data structure. The video system 105 may include a system that trains a neural network model to predict driving behavior based on video data, GPS data, and IMU data. The data structure may include a database, a table, a list, and/or the like. Further details of the video system 105 and the data structure are provided elsewhere herein.

As shown in FIG. 1A, and by reference number 110, the video system 105 may receive video data that includes a plurality of video frames and corresponding GPS data and IMU data associated with a vehicle. For example, dashcams or other video devices of vehicles may record video data (e.g., video footage) of events associated with the vehicles. The video data may be recorded based on a trigger associated with the events. For example, a harsh event may be detected by an accelerometer mounted inside a vehicle (e.g., a kinematics trigger). Alternatively, a processing device of a vehicle may include a machine learning model that detects a potential danger for the vehicle and requests further processing to obtain the video data. Alternatively, a driver of a vehicle may cause the video data to be captured at a moment at which the event occurs. The vehicles or the video devices may transfer the video data to a data structure (e.g., a database, a table, a list, and/or the like). The vehicles may also include sensors, such as GPS sensors, IMU sensors, and/or the like. The vehicles may provide GPS data captured by the GPS sensors to the data structure. The GPS data may include data identifying GPS locations of the vehicles over time. The vehicles may also provide IMU data captured by the IMU sensors to the data structure. The IMU data may include data identifying acceleration measurements and angular velocity measurements of the vehicles over time.

The vehicles may repeatedly transfer the video data, the GPS data, and the IMU data to the data structure over time so that the data structure includes video data identifying videos associated with driving events (e.g., for the vehicles and/or the drivers of the vehicles), the GPS data identifying the GPS locations of the vehicles, and the IMU data identifying the acceleration and angular velocity measurements of the vehicles. In some implementations, the video system 105 may continuously receive the video data, the GPS data, and the IMU data associated with the vehicle from the data structure, may periodically receive the video data, the GPS data, and the IMU data associated with the vehicle from the data structure, may receive the video data, the GPS data, and the IMU data associated with the vehicle from the data structure based on requesting the video data, the GPS data, and the IMU data associated with the vehicle from the data structure, and/or the like.

As further shown in FIG. 1A, and by reference number 115, the video system 105 may align GPS speed, using the IMU data, to compensate for GPS speed delay and to generate modified GPS data. For example, the video system 105 may align GPS speed (e.g., included in the GPS data) and accelerometer data (e.g., included in the IMU data) to compensate and align a GPS speed delay and obtain a GPS speed at a high frequency (e.g., one hundred Hertz, two hundred Hertz, and/or the like). The GPS data with the compensated and aligned GPS speed delay and the GPS speed at the high frequency may correspond to the modified GPS data.

In general, the GPS speed may not correspond perfectly with the video data. Compensating the GPS speed delay with the accelerometer data may further stabilize a prediction of GPS speed from the video data. This is not necessary for turn angles since gyroscopes (e.g., normally included in IMU systems) measure angular speed directly and not angular acceleration. Since acceleration is a derivative of the GPS speed, the video system 105 may integrate the acceleration using a trapezoidal rule. The video system 105 may interpolate one of the GPS speed or the accelerometer data to provide both data at the same frequency, and may normalize the GPS speed and the accelerometer data with means and standard deviations. For example, the GPS speed may be denoted with X, the accelerometer data may be denoted with Y, a length of the GPS speed may be denoted with N, and a length of the accelerometer data may be denoted with M. The video system 105 may pad X on the left with M−1 zeros so that a cross correlation CrossCorr (X, Y) is defined in [0, N+M−1]. The video system 105 may estimate the GPS speed delay of X with respect to Y as argmaxx (CrossCorr (X, Y)) [k]−M+1, where a value C=maxx (CrossCorr (X, Y)) [k] may instead be used as a confidence (e.g., the greater the better) for the GPS speed delay estimation. In some implementations, the video system 105 may utilize the estimated GPS speed delay to realign the GPS speed only if the value C is above a given threshold.

Figure 1B:
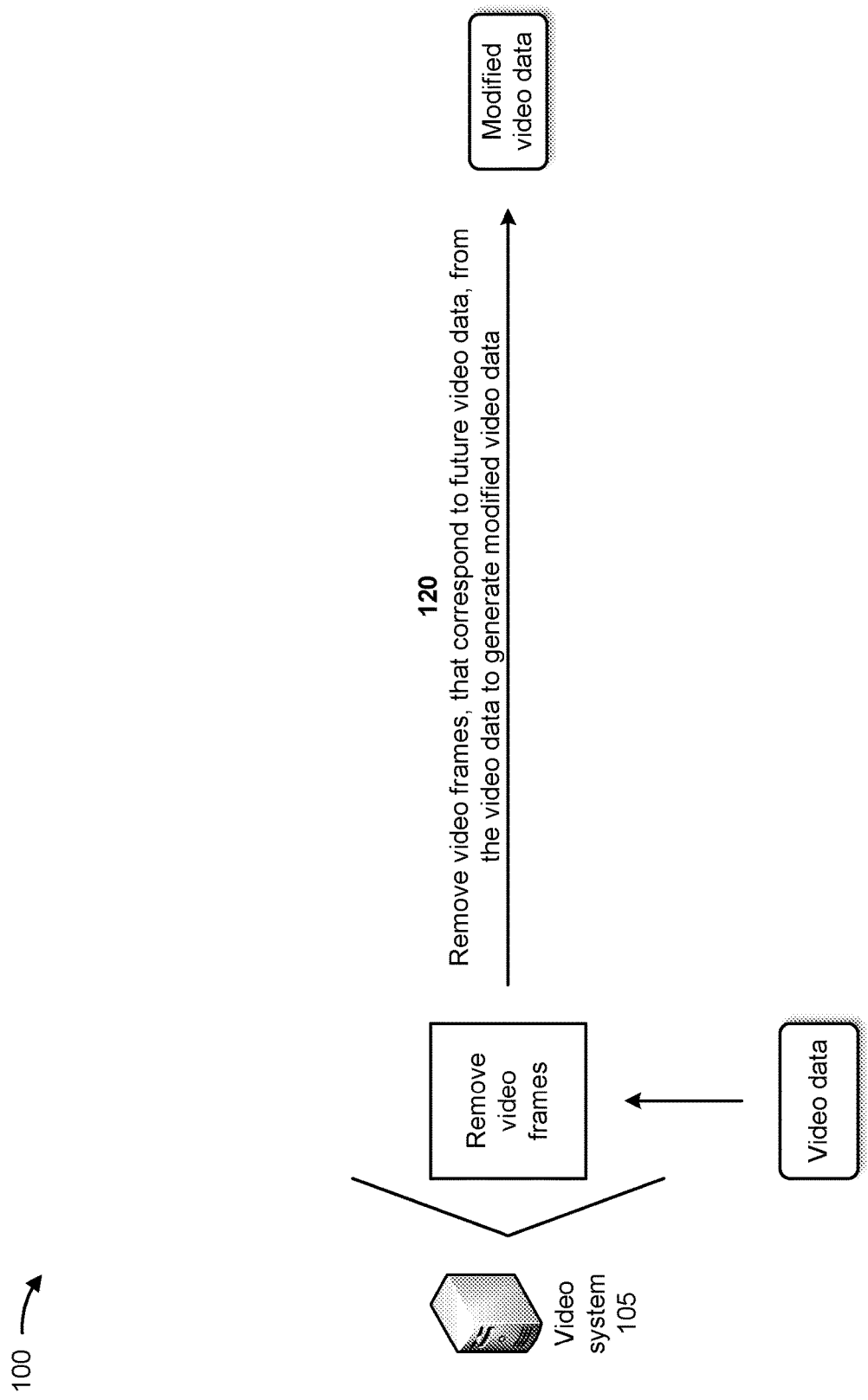

As shown in FIG. 1B, and by reference number 120, the video system 105 may remove video frames, that correspond to future video data, from the video data to generate modified video data. For example, the video system 105 may train a neural network model to predict a future speed and a future turn angle of the vehicle based on additional video data. In some implementations, the neural network model may include a convolutional neural network (CNN) model, an attention CNN model, a vision transformer model, and/or the like. When training the neural network model, the video system 105 may remove video frames and/or predict an appearance of removed video frames from the video data. The removed video frames may include video frames (e.g., future video frames) that occur after a time period in the video data (e.g., after ten seconds, after one minute, and/or the like). The video data without the removed the video frames may correspond to the modified video data. The removed video frames from the video data may enable the neural network model to predict what is provided in the removed video frames (e.g., how an actual driver reacted to a particular situation).

Figure 1C:
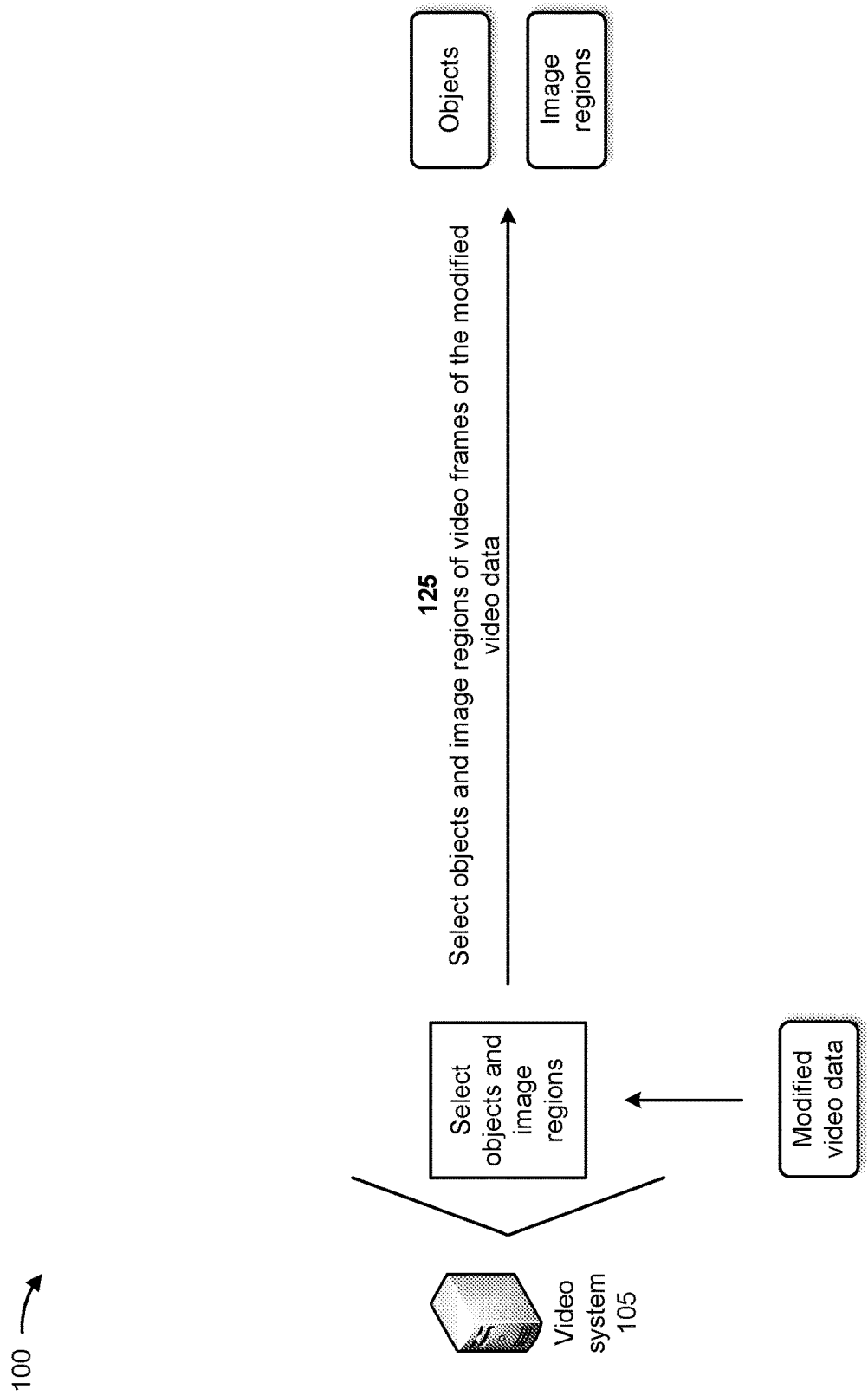

As shown in FIG. 1C, and by reference number 125, the video system 105 may select objects and image regions of video frames in the modified video data. For example, when training the neural network model, the video system 105 may select objects and image regions of video frames in the modified video data. In some implementations, the video system 105 may randomly select the objects (e.g., vehicles, traffic lights, and/or the like) and the image regions (e.g., fixed regions, portions of the road, or outputs of a segmentation model) of the video frames to mask in modified video data. In some implementations, when selecting the objects of the video frames of the modified video data, the video system 105 may utilize an object detection model to select the objects of the video frames of the modified video data. In some implementations, when selecting the image regions of the video frames of the modified video data, the video system 105 may utilize a semantic segmentation model to select the image regions of the video frames of the modified video data.

Figure 1D:
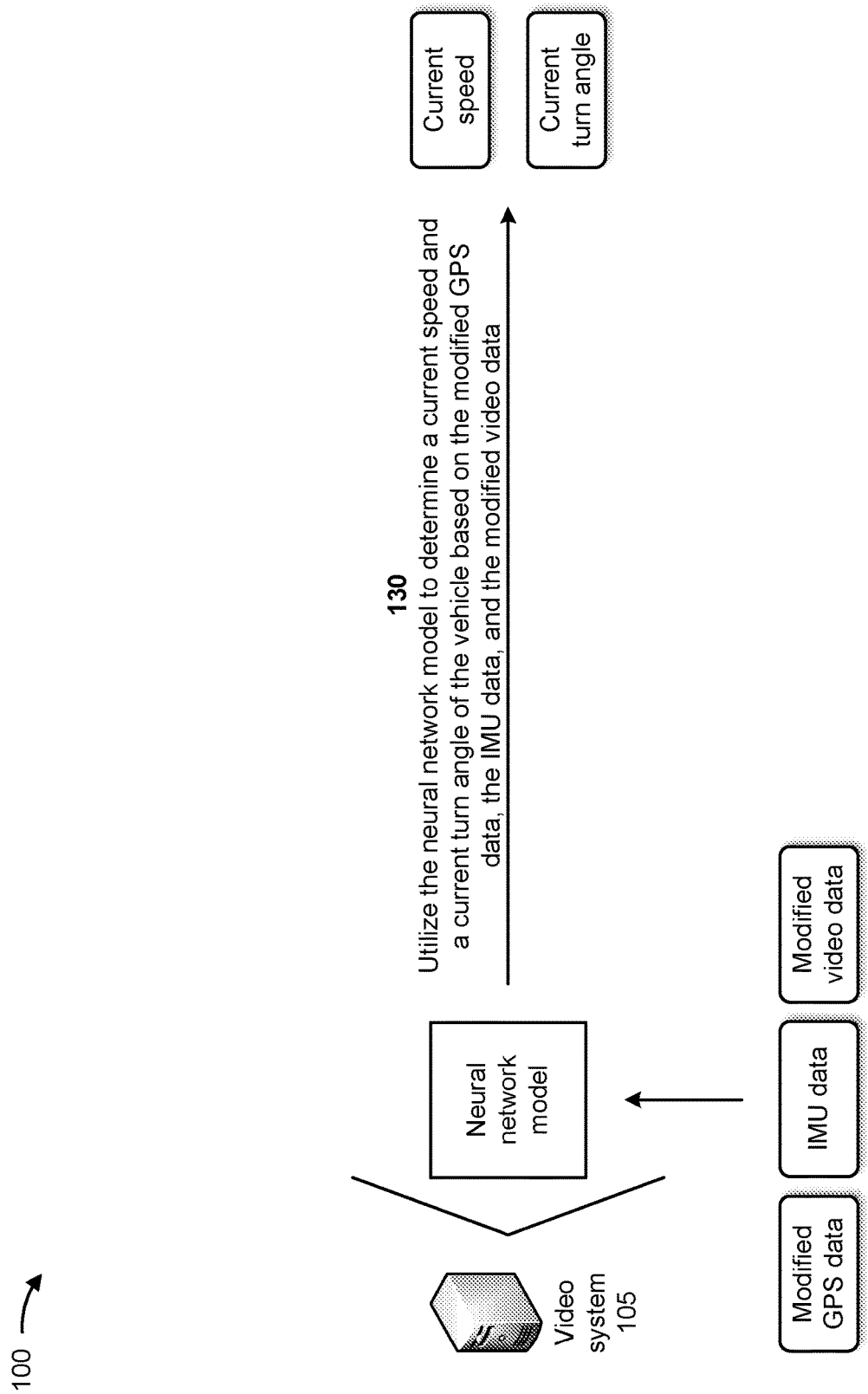

As shown in FIG. 1D, and by reference number 130, the video system 105 may utilize the neural network model to determine a current speed and a current turn angle of the vehicle based on the modified GPS data, the IMU data, and the modified video data. For example, ultimately, a goal of the neural network model is to receive video data as input and to predict a future speed and a future steering behavior (e.g., a future turn angle) of the vehicle based on the video data. However, the video system 105 may also train the neural model about a scene and semantics associated with the video data. Besides learning to predict the future speed and the future turn angle, the video system 105 may introduce a number of auxiliary tasks during the training stage that aid the training of the neural network model. In some implementations, the video system 105 may train the neural network model to detect a current speed and a current turn angle of the vehicle based on the modified GPS data, the IMU data, and the modified video data. The determination of the current or instantaneous speed and the current turn angle of the vehicle may cause the neural model to understand what objects in a road video are moving and what objects are static. This may occur because the static objects are useful to predict the current speed of the vehicle relative to an inertial frame of the IMU data.

Figure 1E:
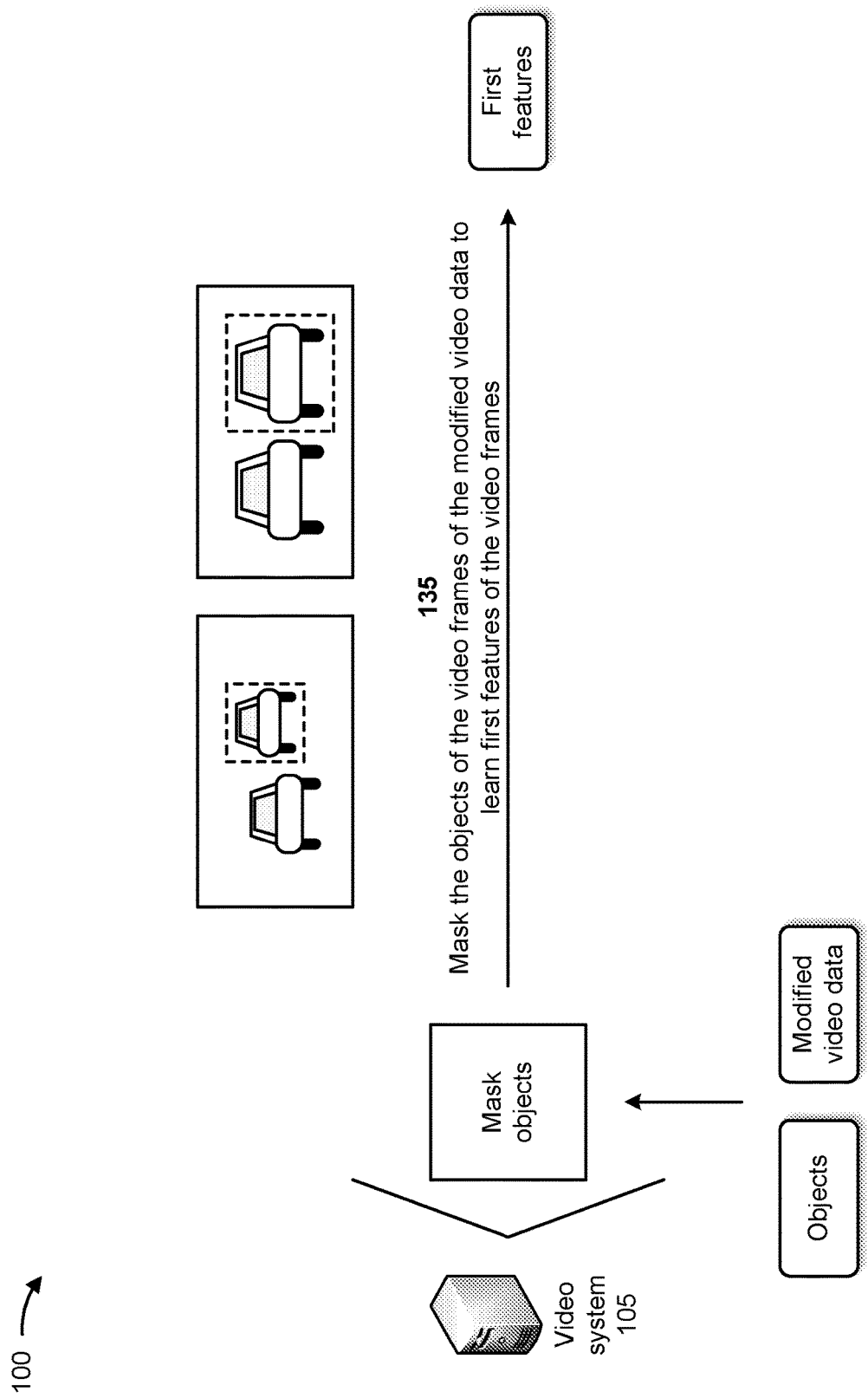

As shown in FIG. 1E, and by reference number 135, the video system 105 may mask the objects of the video frames of the modified video data to learn first features of the video frames. For example, the video system 105 may introduce an auxiliary task (e.g., during the training stage that aids the training of the neural network model) of utilizing one or more object detection models to remove or mask the objects of the video frames of the modified video data and to cause learning of a reconstruction of the masked objects. Masking the objects of the video frames of the modified video data may enable the neural network model to learn first features of the video frames, such as colors and shapes of vehicles, traffic light positions and statuses, and/or the like. The reconstruction of the masked objects causes the neural network model to learn object detection along with tracking, since otherwise a reconstructed image would miss the first features of the video frames (e.g., important characteristics, such as colors and shapes of vehicles, traffic light positions and statuses, and/or the like).

Figure 1F:
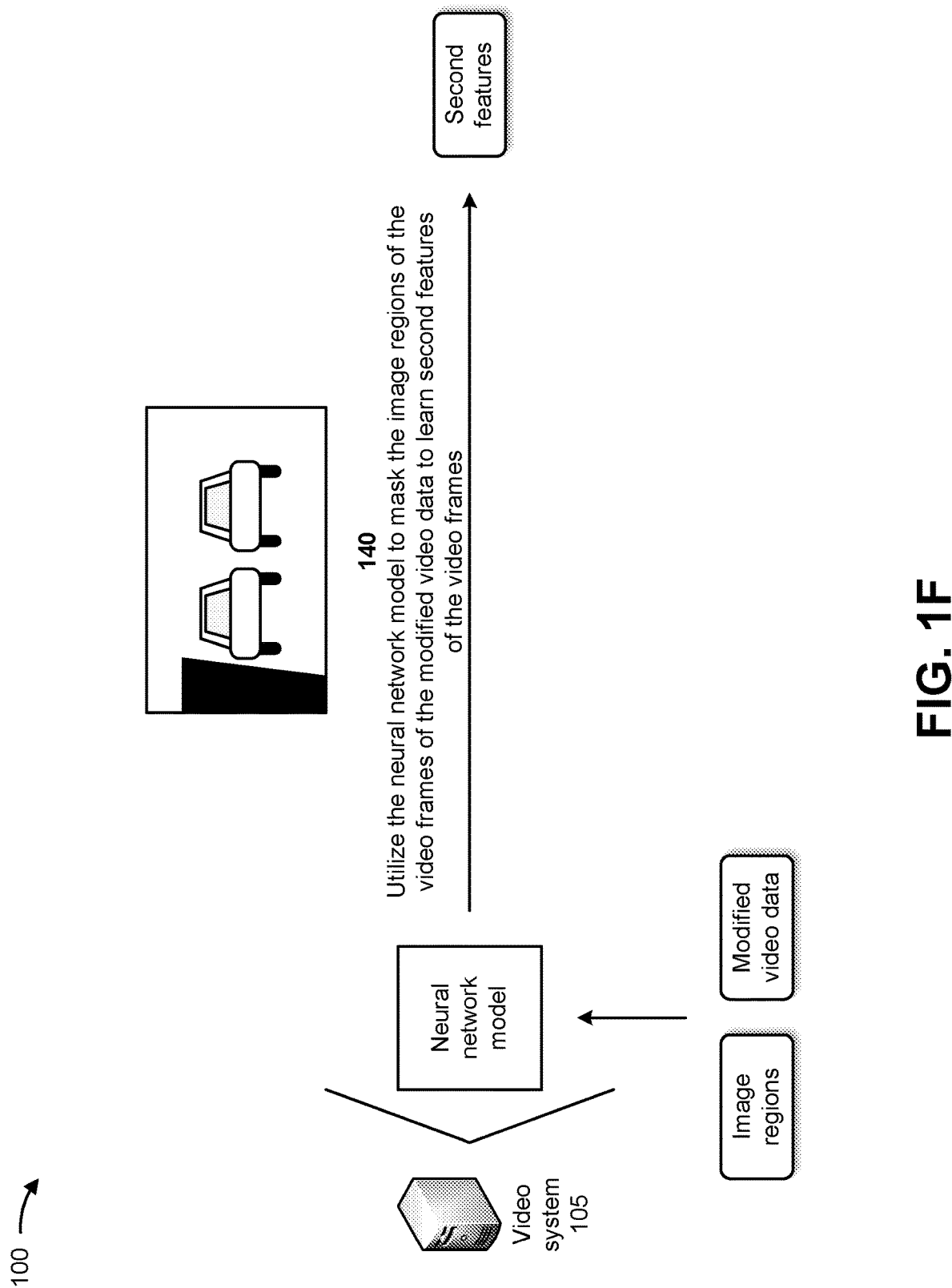

As shown in FIG. 1F, and by reference number 140, the video system 105 may utilize the neural network model to mask the image regions and/or predict an appearance of masked regions of the video frames of the modified video data to learn second features of the video frames. For example, the video system 105 may introduce an auxiliary task (e.g., during the training stage that aids the training of the neural network model) of utilizing one or more semantic segmentation models to remove or mask the image regions (e.g., targeted regions, such as roads) of the video frames of the modified video data and to cause learning of a reconstruction of the masked images. Masking the images of the video frames of the modified video data may enable the neural network model to learn second features of the video frames, such a drivable area for the vehicle, potential turn angles of the vehicle, and/or the like. The reconstruction of the masked images may cause the neural network model to learn image detection, since otherwise a reconstructed image would miss the second features of the video frames (e.g., important characteristics, such as the drivable area for the vehicle, the potential turn angles of the vehicle, and/or the like).

In some implementations, the object detection or semantic segmentation models may enable the video system 105 to accelerate training of the neural network model by incorporating existing knowledge about the objects and the image regions. In some implementations, inputs and outputs of the neural network model may be extracted directly from sensor data, without a need to manually provide labels. However, while the object detection and segmentation models are trained using labeled data, the video system 105 may utilize the labeled data to accelerate the training of the neural network model since eventually all road objects may be randomly masked.

In some implementations, the video system 105 may apply other self-supervision methods to further enhance the semantic capabilities of the neural network model. Target task losses may guide backpropagation training of the neural network model, and may include a mean squared error loss, a mean absolute error loss, or other regression losses for sensor data (e.g., the speed and the turn rate); a binary cross entropy loss, a categorical cross entropy loss, a focal loss, or other classification losses for the sensor data; a mean squared error loss, a mean absolute error loss, an adversarial loss, or other image-related losses for the image reconstruction tasks; and/or the like.

As shown in FIG. 1G, and by reference number 145, the video system 105 may generate a trained neural network model that predicts a future speed and a future turn angle of the vehicle based on the current speed, the current turn angle, the first features, and the second features. For example, upon completion of the training procedure, the video system 105 may generate the trained neural network model. In some implementations, the trained neural network model may be trained to predict a future speed and a future turn angle of the vehicle based on the current speed of the vehicle, the current turn angle of the vehicle, the first features, and the second features. In some implementations, the trained neural network model may predict multiple possible future speeds and/or trajectories of the vehicle. For a self-driving vehicle and provided that a vehicle route is programmed in advance, the future speed and the future turn angle of the vehicle may be utilized as information by a drive-by-wire board of the vehicle. However, for a vehicle with an ADAS, the trained neural network model may provide the multiple possible future speeds and/or trajectories of the vehicle given a state of the vehicle. For example, the trained neural network model may predict "going forward" or "turning right" as possibilities, but may predict "turning left" as something that was never seen before in a given scenario. Thus, a "turning left" maneuver may raise an alarm for the vehicle.

Figure 1H:
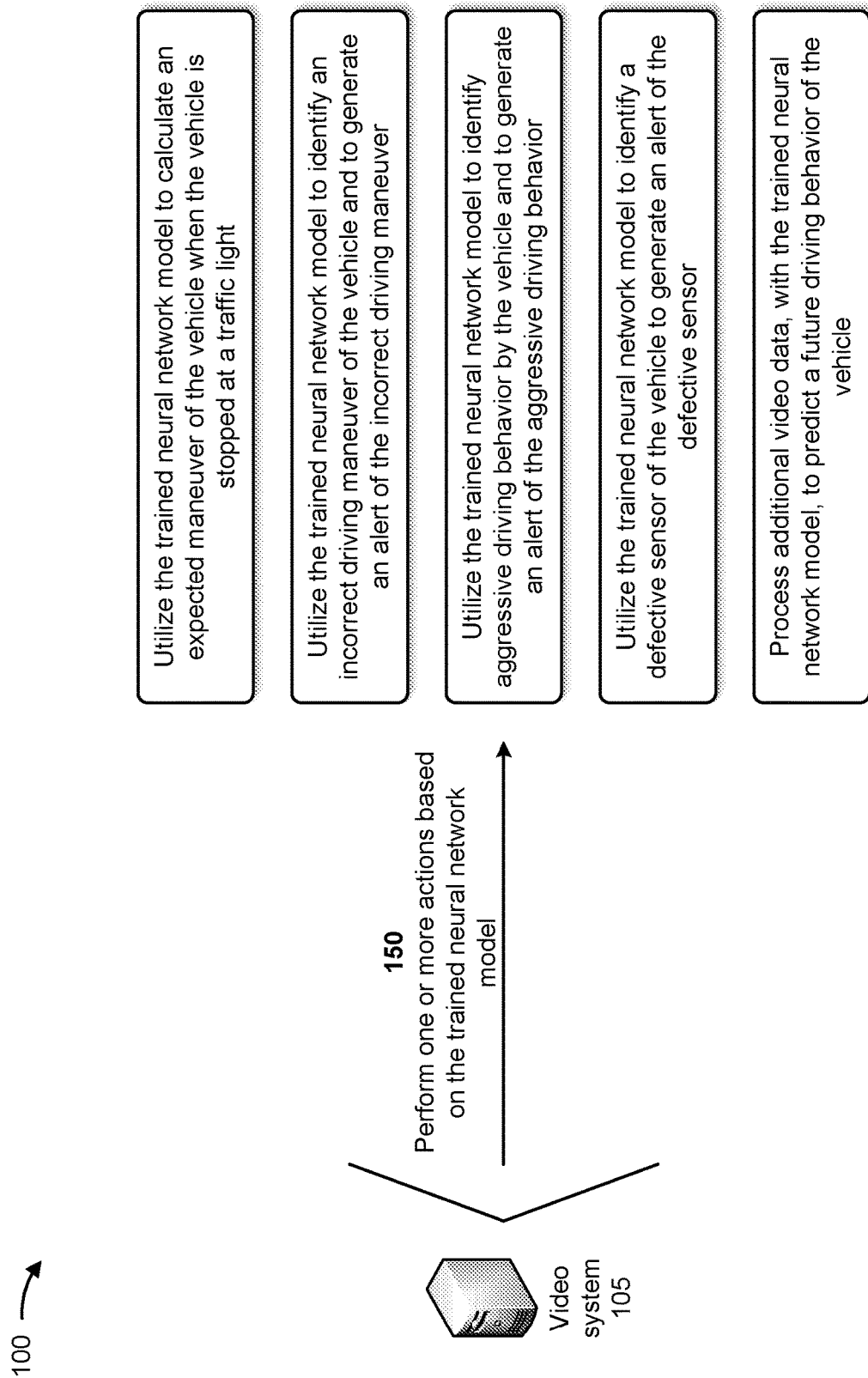

As shown in FIG. 1H, and by reference number 150, the video system 105 may perform one or more actions based on the trained neural network model. In some implementations, performing the one or more actions includes the video system 105 utilizing the trained neural network model to calculate an expected maneuver of the vehicle when the vehicle is stopped at a traffic light. For example, the trained neural network model may receive video data of a road situation, and may determine semantics of the road situation. The semantics of the road situation may indicate to the trained neural network model that the vehicle is stopped at a left turn lane and that, when the appropriate traffic light turns green, the vehicle should accelerate and turn left. The trained neural network model may utilize sensor data after the traffic lights turns green to determine whether the vehicle is performing the appropriate maneuver. From a self-driving perspective, as soon as the light turns green, the trained neural network model may inform the vehicle about the appropriate maneuver (e.g., increase the speed to X meters per second and steer Y degrees over the period of Z seconds).

From an ADAS perspective, the trained neural network model may activate one or more assistive triggers. For example, if the driver is distracted and does not accelerate after a few seconds, the trained neural network model may trigger an alarm advising the driver to move forward. In another example, if the driver decides to move forward, without realizing that the lane is wrong, the trained neural network model may trigger an alarm advising the driver to turn left. If the driver still moves forward, the trained neural network model may notify a fleet manager about the incorrect driving behavior (e.g., using the wrong lane to go forward). In this way, the video system 105 may conserve computing resources, networking resources, and/or other resources that would have otherwise been consumed by failing to train the machine learning model to predict information useful for actual driving conditions.

In some implementations, performing the one or more actions includes the video system 105 utilizing the trained neural network model to identify an incorrect driving maneuver of the vehicle and to generate an alert of the incorrect driving maneuver. For example, the trained neural network model may correctly predict future speeds and future turn angles for a number of situations that would be difficult to hard code manually for self-driving or a driver alert. In some implementations, the trained neural network model may identify an incorrect driving maneuver of the vehicle and may generate an alert of the incorrect driving maneuver when the vehicle is turning right when a traffic light is red when that is not allowed, when the vehicle is not turning right when a traffic light is red when that is allowed, when the vehicle fails to stop at a stop sign, when the vehicle fails to decrease speed to reasonable levels at a yield sign, when the vehicle is going too fast when there is inclement weather, when the vehicle turns left in a roundabout when the driver is expected to go around the roundabout, when the vehicle fails to wait for a proper turn at a four-way stop, when the vehicle performs illegal turns, when the vehicle performs a maneuver uncommon enough that it generates a deviation from an expected maneuver, and/or the like. In this way, the video system 105 may conserve computing resources, networking resources, and/or other resources that would have otherwise been consumed by generating incorrect predictions with the improperly trained machine learning model.

In some implementations, performing the one or more actions includes the video system 105 utilizing the trained neural network model to identify aggressive driving behavior by the vehicle and to generate an alert of the aggressive driving behavior. For example, the vehicle's speed and turn rate are consistently above what the trained neural network model predicts for a future speed and turn rate, the trained neural network model may identify the driving style as aggressive and may generate an alert (e.g., for the driver or a fleet manager) of the aggressive driving behavior. In this way, the video system 105 may conserve computing resources, networking resources, and/or other resources that would have otherwise been consumed by performing dangerous driving maneuvers based on the incorrect predictions.

In some implementations, performing the one or more actions includes the video system 105 utilizing the trained neural network model to identify a defective sensor of the vehicle to generate an alert of the defective sensor. For example, driving may entail movement in a two-dimensional plane, and the trained neural network model may utilize a vehicle acceleration (e.g., the GPS data) and Z-axis gyroscope data (e.g., the IMU data). If the GPS data and the IMU data deviates from predictions of the trained neural network model, the trained neural network model may determine that a vehicle camera or vehicle sensors are not installed or working correctly. In some implementations, the trained neural network model may utilize a sum of squared differences, a sum of absolute differences, or any other metric that measures differences between two curves when determining whether the GPS data and the IMU data deviate from the predictions of the trained neural network model. In this way, the video system 105 may conserve computing resources, networking resources, and/or other resources that would have otherwise been consumed by handling traffic accidents caused by the dangerous driving maneuvers.

In some implementations, performing the one or more actions includes the video system 105 processing additional video data, with the trained neural network model, to predict a future driving behavior of the vehicle. For example, the video system 105 may receive additional video data from the vehicle, and may process the additional video data, with the trained neural network model, to predict the future driving behavior of the vehicle (e.g., a future speed and a future turn angle of the vehicle). In this way, the video system 105 may conserve computing resources, networking resources, and/or other resources that would have otherwise been consumed by failing to train the machine learning model to predict information useful for actual driving conditions, generating incorrect predictions with the improperly trained machine learning model, performing dangerous driving maneuvers based on the incorrect predictions, handling traffic accidents caused by the dangerous driving maneuvers, and/or the like.

In this way, the video system 105 trains a neural network model to predict driving behavior based on video data, GPS data, and IMU data. For example, the video system 105 may train a neural network model to utilize GPS data and IMU data to determine future driving maneuvers based on input from a camera associated with a vehicle. The video system 105 may decouple predicted driving commands from actual physical inputs, which makes the neural network model agnostic to vehicle make, model, and size. The video system 105 may generate a trained neural network model that identifies instantaneous speed and turn rate for a vehicle from video data, and that predicts vehicle maneuvers based on the video data. The video system 105 may utilize auxiliary tasks that improve an ability of the neural network mode to understand semantics of the video data, and may provide inputs of desired maneuvers to the vehicle to achieve a target trajectory. Thus, the video system 105 may conserve computing resources, networking resources, and/or other resources that would have otherwise been consumed by failing to train the machine learning model to predict information useful for actual driving conditions, generating incorrect predictions with the improperly trained machine learning model, performing dangerous driving maneuvers based on the incorrect predictions, handling traffic accidents caused by the dangerous driving maneuvers, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
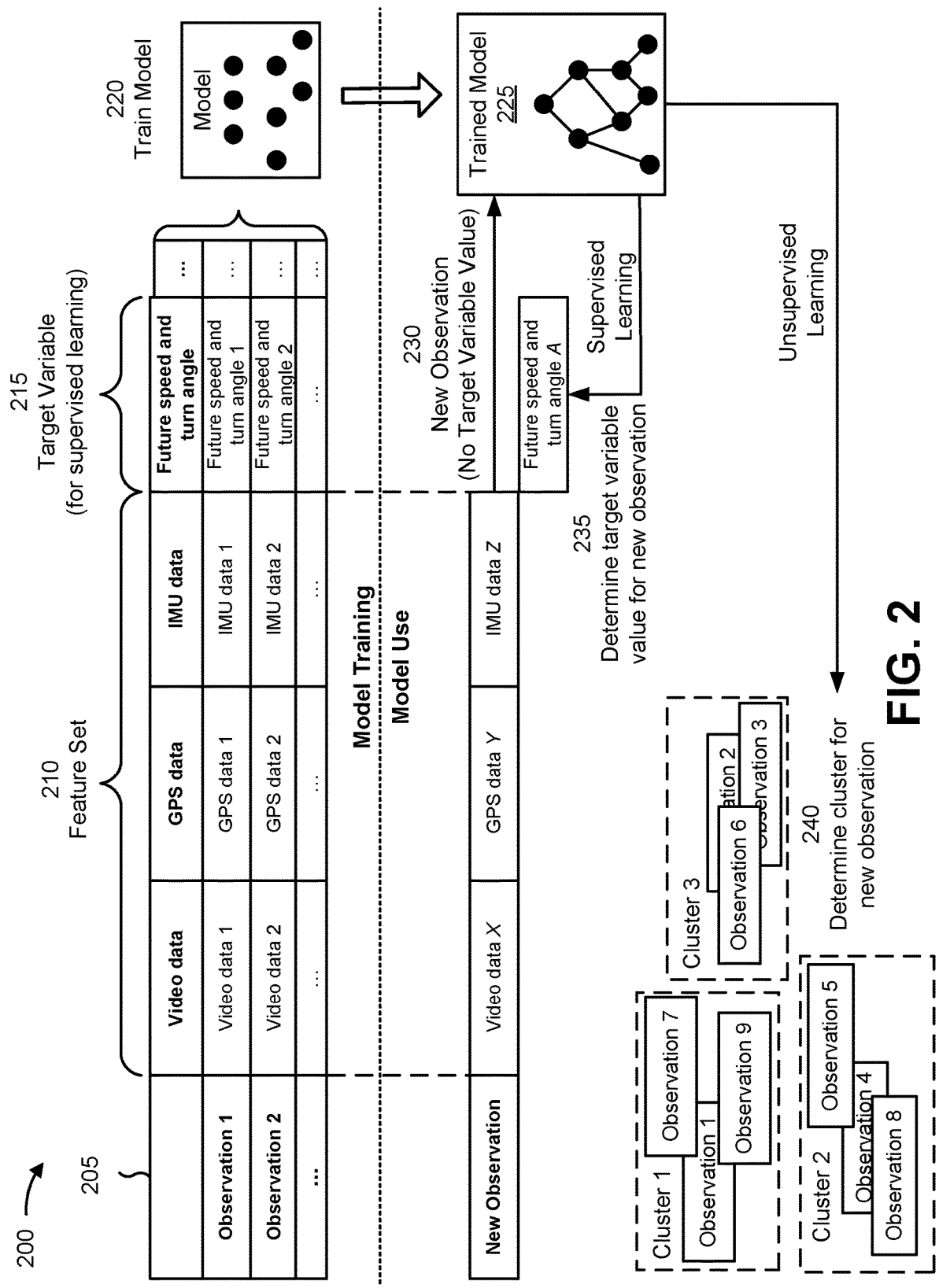
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the video system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the video system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of video data, a second feature of GPS data, a third feature of IMU data, and so on. As shown, for a first observation, the first feature may have a value of video data 1, the second feature may have a value of GPS data 1, the third feature may have a value of IMU data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a future speed and turn angle, which has a value of future speed and turn angle 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of video data X, a second feature of GPS data Y, a third feature of IMU data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of future speed and turn angle A for the target variable of future speed and turn angle for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a GPS data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine a future speed and turn angle of a vehicle. The machine learning system may enable recognition and/or identification of tens, hundreds, thousands, or millions of features and/or feature values for tens, hundreds, thousands, or millions of observations, thereby increasing accuracy and consistency and reducing delay associated with determining a future speed and turn angle of a vehicle relative to requiring computing resources to be allocated for tens, hundreds, or thousands of operators to manually determine a future speed and turn angle of a vehicle.

As indicated above, FIG. 2 is provided as an example. Other examples may differ from what is described in connection with FIG. 2.

Figure 3:
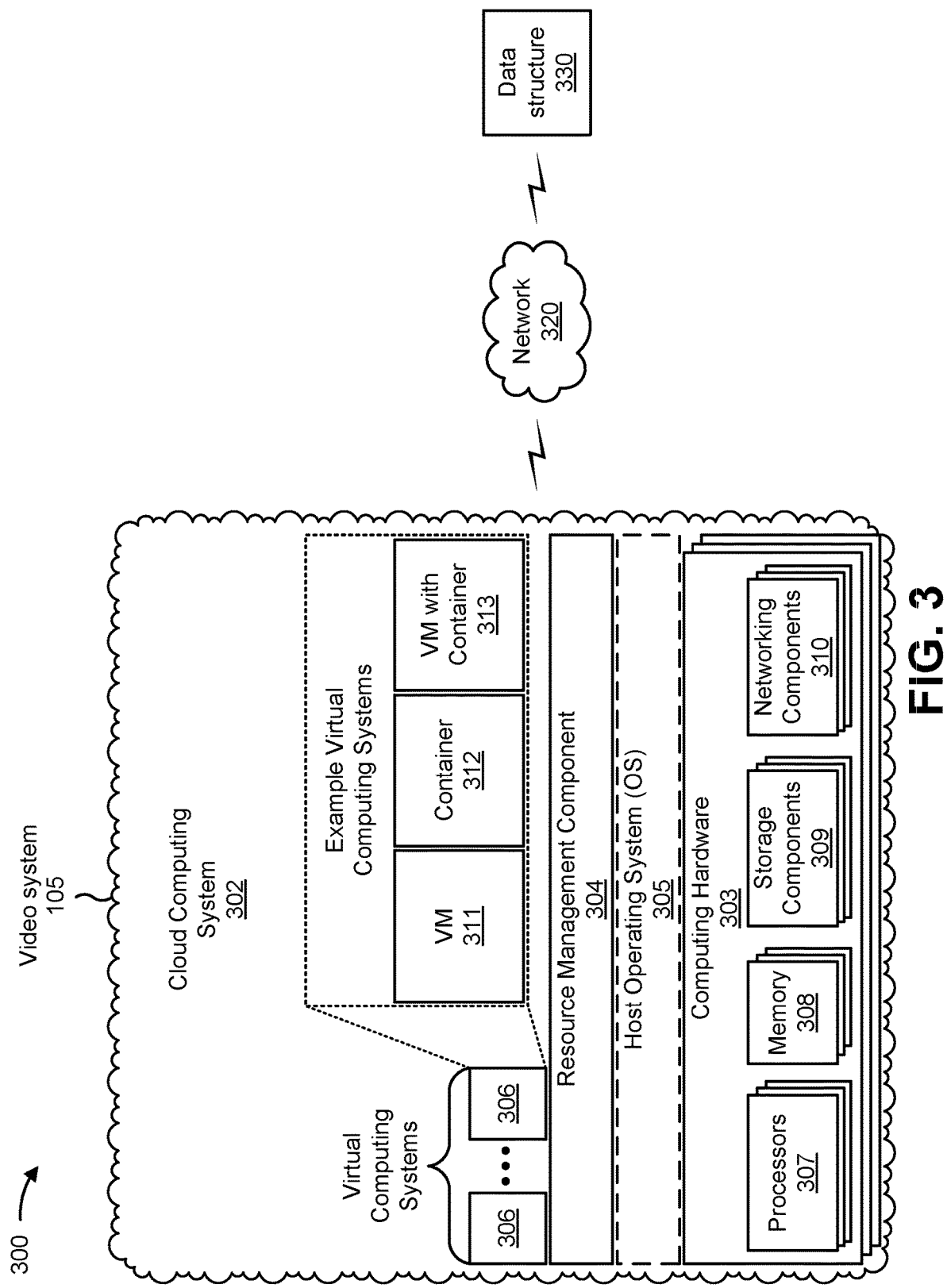
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 105, which may include one or more elements of and/or may execute within a cloud computing system 302. The cloud computing system 302 may include one or more elements 303-313, as described in more detail below. As further shown in FIG. 3, the environment 300 may include a network 320 and/or a data structure 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 105 may include one or more elements 303-313 of the cloud computing system 302, may execute within the cloud computing system 302, and/or may be hosted within the cloud computing system 302, in some implementations, the video system 105 may not be cloud-based (e.g., may be implemented outside of a cloud computing system) or may be partially cloud-based. For example, the video system 105 may include one or more devices that are not part of the cloud computing system 302, such as a device 400 of FIG. 4, which may include a standalone server or another type of computing device. The video system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
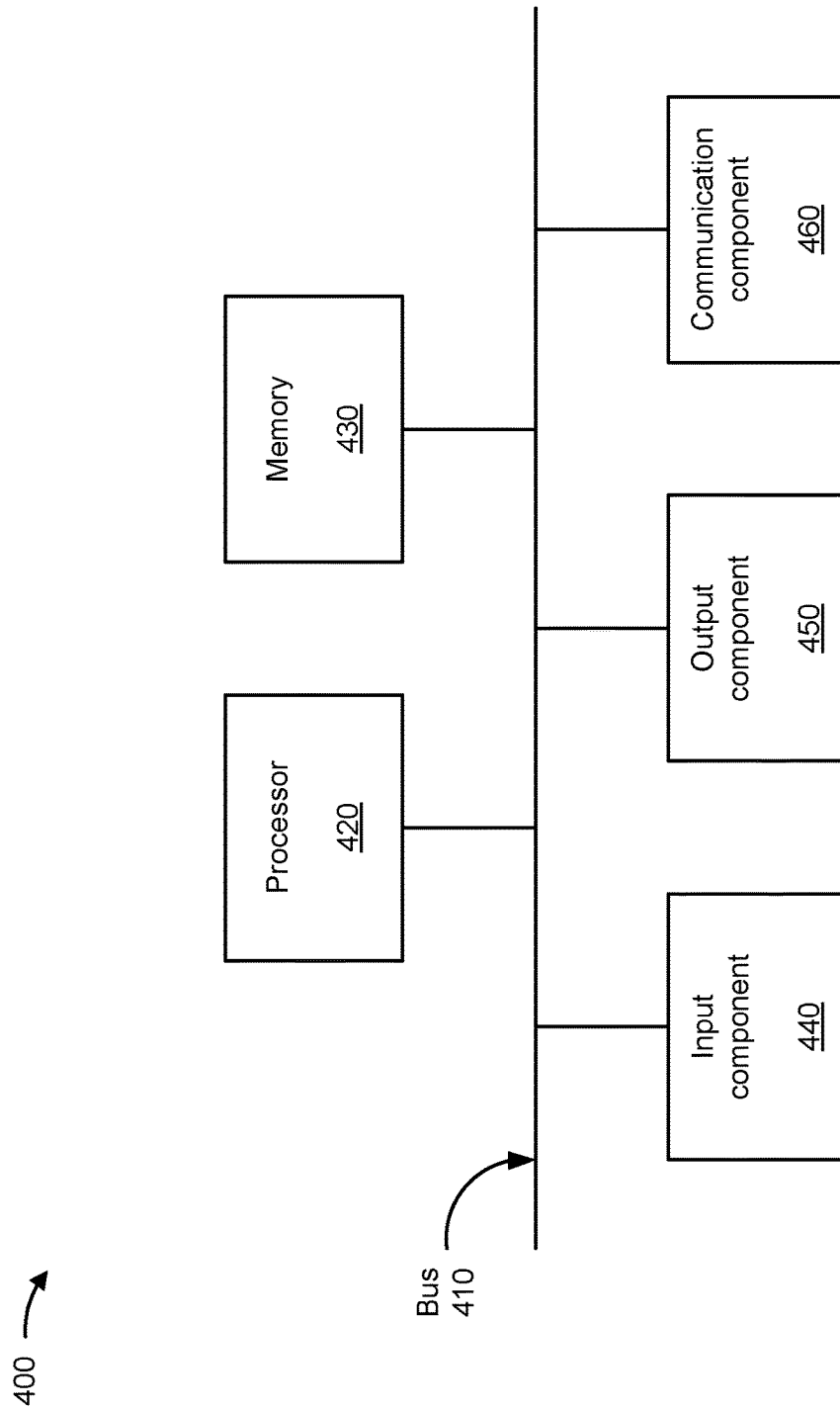
FIG. 4 is a diagram of example components of one or more devices of FIG. 3.

FIG. 4 is a diagram of example components of a device 400, which may correspond to the video system 105 and/or the data structure 330. In some implementations, the video system 105 and/or the data structure 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 depicts a flowchart of an example process 500 for training a neural network model to predict driving behavior based on video data, GPS data, and IMU data. In some implementations, one or more process blocks of FIG. 5 may be performed by a device (e.g., the video system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving video data and corresponding GPS data and IMU data associated with a vehicle (block 510). For example, the device may receive video data that includes a plurality of video frames and corresponding GPS data and IMU data associated with a vehicle, as described above. In some implementations, the vehicle is a self-driving vehicle or includes an ADAS.

As further shown in FIG. 5, process 500 may include removing video frames from the video data to generate modified video data (block 520). For example, the device may remove video frames from the video data to generate modified video data, as described above.

As further shown in FIG. 5, process 500 may include selecting objects and image regions of video frames of the modified video data (block 530). For example, the device may select objects and image regions of video frames of the modified video data, as described above. In some implementations, selecting the objects of the video frames of the modified video data includes utilizing an object detection model to select the objects of the video frames of the modified video data. In some implementations, selecting the image regions of the video frames of the modified video data includes utilizing a semantic segmentation model to select the image regions of the video frames of the modified video data.

As further shown in FIG. 5, process 500 may include determining a current speed and a current turn angle of the vehicle (block 540). For example, the device may determine a current speed and a current turn angle of the vehicle based on the GPS data, the IMU data, and the modified video data, as described above.

As further shown in FIG. 5, process 500 may include masking the objects of the video frames of the modified video data to learn first features (block 550). For example, the device may mask the objects of the video frames of the modified video data to learn first features of the video frames of the modified video data, as described above.

As further shown in FIG. 5, process 500 may include masking the image regions of the video frames of the modified video data to learn second features (block 560). For example, the device may mask the image regions of the video frames of the modified video data to learn second features of the video frames of the modified video data, as described above.

As further shown in FIG. 5, process 500 may include generating a trained neural network model based on the current speed, the current turn angle, the first features, and the second features (block 570). For example, the device may generate a trained neural network model based on the current speed, the current turn angle, the first features, and the second features, as described above. In some implementations, the trained neural network model is configured to predict a future speed and a future turn angle of the vehicle based on additional video data. In some implementations, the trained neural network model is one of a CNN model, an attention CNN model, or a vision transformer model.

As further shown in FIG. 5, process 500 may include performing one or more actions based on the trained neural network model (block 580). For example, the device may perform one or more actions based on the trained neural network model, as described above. In some implementations, performing the one or more actions based on the trained neural network model includes implementing the trained neural network model in the vehicle to enable the vehicle to predict a future speed and a future turn angle of the vehicle based on additional video data. In some implementations, performing the one or more actions based on the trained neural network model includes utilizing the trained neural network model to calculate an expected maneuver of the vehicle when the vehicle is stopped at a traffic light. In some implementations, performing the one or more actions based on the trained neural network model includes utilizing the trained neural network model to identify an incorrect driving maneuver of the vehicle and to generate an alert of the incorrect driving maneuver.

In some implementations, performing the one or more actions based on the trained neural network model includes utilizing the trained neural network model to identify aggressive driving behavior associated with the vehicle and to generate an alert of the aggressive driving behavior. In some implementations, the one or more processors, performing the one or more actions based on the trained neural network model includes one or more of utilizing the trained neural network model to identify a defective sensor of the vehicle to generate an alert of the defective sensor, or processing additional video data, with the trained neural network model, to predict a future driving behavior of the vehicle.

In some implementations, process 500 includes aligning GPS speed, using the IMU data, to compensate for GPS speed delay and to generate modified GPS data, wherein the GPS speed and the GPS speed delay are associated with the vehicle. In some implementations, aligning the GPS speed, using the IMU data, to compensate for the GPS speed delay and to generate the modified GPS data includes integrating a GPS acceleration to generate a first GPS speed signal; interpolating a second GPS speed signal based on the first GPS speed signal; normalizing the first GPS speed signal and the second GPS speed signal to generate a normalized first GPS speed signal and a normalized second GPS speed signal; estimating the GPS speed delay based on the normalized first GPS speed signal and the normalized second GPS speed signal; and generating the modified GPS data based on the GPS speed delay.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, video data from a video camera of a vehicle, the video data including a plurality of video frames and corresponding global positioning system (GPS) data of the vehicle and inertial measurement unit (IMU) data associated with the vehicle;
   removing, by the device, video frames from the video data to generate modified video data;
   selecting, by the device, objects and image regions of video frames of the modified video data;
   determining, by the device, a current speed and a current turn angle of the vehicle based on the GPS data, the IMU data, and the modified video data;
   masking, by the device, the objects of the video frames of the modified video data to learn first features of the video frames of the modified video data;
   masking, by the device, the image regions of the video frames of the modified video data to learn second features of the video frames of the modified video data;
   generating, by the device and based on the current speed, the current turn angle, the first features, and the second features, a trained neural network for controlling the vehicle; and
   performing, by the device, one or more actions based on the trained neural network model.

2. The method of claim 1, further comprising:
   aligning GPS speed, using the IMU data, to compensate for GPS speed delay and to generate modified GPS data,
      wherein the GPS speed and the GPS speed delay are associated with the vehicle.

3. The method of claim 2, wherein aligning the GPS speed, using the IMU data, to compensate for the GPS speed delay and to generate the modified GPS data comprises:
   integrating a GPS acceleration to generate a first GPS speed signal;
   interpolating a second GPS speed signal based on the first GPS speed signal;
   normalizing the first GPS speed signal and the second GPS speed signal to generate a normalized first GPS speed signal and a normalized second GPS speed signal;
   estimating the GPS speed delay based on the normalized first GPS speed signal and the normalized second GPS speed signal; and
   generating the modified GPS data based on the GPS speed delay.

4. The method of claim 1, wherein the trained neural network model is configured to predict a future speed and a future turn angle of the vehicle based on additional video data.

5. The method of claim 1, wherein the trained neural network model is one of a convolutional neural network (CNN) model, an attention CNN model, or a vision transformer model.

6. The method of claim 1, wherein selecting the objects of the video frames of the modified video data comprises:
   utilizing an object detection model to select the objects of the video frames of the modified video data.

7. The method of claim 1, wherein selecting the image regions of the video frames of the modified video data comprises:
   utilizing a semantic segmentation model to select the image regions of the video frames of the modified video data.

8. A device, comprising:
   one or more processors configured to:
      receive video data that includes a plurality of video frames and corresponding global positioning system (GPS) data and inertial measurement unit (IMU) data associated with a vehicle;
      align GPS speed, using the IMU data, to compensate for GPS speed delay and to generate modified GPS data,
         wherein the GPS speed and the GPS speed delay are associated with the vehicle;
      remove video frames from the video data to generate modified video data;
      select objects and image regions of video frames of the modified video data;
      determine a current speed and a current turn angle of the vehicle based on the modified GPS data, the IMU data, and the modified video data;
      mask the objects of the video frames of the modified video data to learn first features of the video frames of the modified video data;
      mask the image regions of the video frames of the modified video data to learn second features of the video frames of the modified video data;

generate a trained neural network model based on the current speed, the current turn angle, the first features, and the second features; and perform one or more actions based on the trained neural network model.

9. The device of claim 8, wherein the vehicle is a self-driving vehicle or includes an advanced driver assistance system.

10. The device of claim 8, wherein the one or more processors, to perform the one or more actions based on the trained neural network model, are configured to:

implement the trained neural network model in the vehicle to enable the vehicle to predict a future speed and a future turn angle of the vehicle based on additional video data.

11. The device of claim 8, wherein the one or more processors, to perform the one or more actions based on the trained neural network model, are configured to:

utilize the trained neural network model to calculate an expected maneuver of the vehicle when the vehicle is stopped at a traffic light.

12. The device of claim 8, wherein the one or more processors, to perform the one or more actions based on the trained neural network model, are configured to:

utilize the trained neural network model to identify an incorrect driving maneuver of the vehicle and to generate an alert of the incorrect driving maneuver.

13. The device of claim 8, wherein the one or more processors, to perform the one or more actions based on the trained neural network model, are configured to:

utilize the trained neural network model to identify aggressive driving behavior associated with the vehicle and to generate an alert of the aggressive driving behavior.

14. The device of claim 8, wherein the one or more processors, to perform the one or more actions based on the trained neural network model, are configured to one or more of:

utilize the trained neural network model to identify a defective sensor of the vehicle to generate an alert of the defective sensor; or process additional video data, with the trained neural network model, to predict a future driving behavior of the vehicle.

15. A non-transitory computer-readable medium storing a set of instructions, the set of instructions comprising:

one or more instructions that, when executed by one or more processors of a device, cause the device to:

receive video data that includes a plurality of video frames and corresponding global positioning system (GPS) data and inertial measurement unit (IMU) data associated with a vehicle;

remove video frames from the video data to generate modified video data;

select objects and image regions of video frames of the modified video data;

determine a current speed and a current turn angle of the vehicle based on the GPS data, the IMU data, and the modified video data;

mask the objects of the video frames of the modified video data to learn first features of the video frames of the modified video data;

mask the image regions of the video frames of the modified video data to learn second features of the video frames of the modified video data;

generate a trained neural network model based on the current speed, the current turn angle, the first features, and the second features; and implement the trained neural network model in the vehicle to enable the vehicle to predict a future speed and a future turn angle of the vehicle based on additional video data.

16. The non-transitory computer-readable medium of claim 15, wherein the one or more instructions further cause the device to:

align GPS speed, using the IMU data, to compensate for GPS speed delay and to generate modified GPS data, wherein the GPS speed and the GPS speed delay are associated with the vehicle.

17. The non-transitory computer-readable medium of claim 16, wherein the one or more instructions, that cause the device to align the GPS speed, using the IMU data, to compensate for the GPS speed delay and to generate the modified GPS data, cause the device to:

integrate a GPS acceleration to generate a first GPS speed signal;

interpolate a second GPS speed signal based on the first GPS speed signal;

normalize the first GPS speed signal and the second GPS speed signal to generate a normalized first GPS speed signal and a normalized second GPS speed signal;

estimate the GPS speed delay based on the normalized first GPS speed signal and the normalized second GPS speed signal; and generate the modified GPS data based on the GPS speed delay.

18. The non-transitory computer-readable medium of claim 15, wherein the trained neural network model is configured to predict a future speed and a future turn angle of the vehicle based on additional video data.

19. The non-transitory computer-readable medium of claim 15, wherein the one or more instructions, that cause the device to select the objects of the video frames of the modified video data, cause the device to:

utilize an object detection model to select the objects of the video frames of the modified video data.

20. The non-transitory computer-readable medium of claim 15, wherein the one or more instructions, that cause the device to select the image regions of the video frames of the modified video data, cause the device to:

utilize a semantic segmentation model to select the image regions of the video frames of the modified video data.

* * * * *